No. 679,890. Patented Aug. 6, 1901.
L. L. FERGUSON.
APPARATUS FOR MEASURING ERRORS OF REFRACTION IN THE HUMAN EYE.
(Application filed July 18, 1900.)
(No Model.)
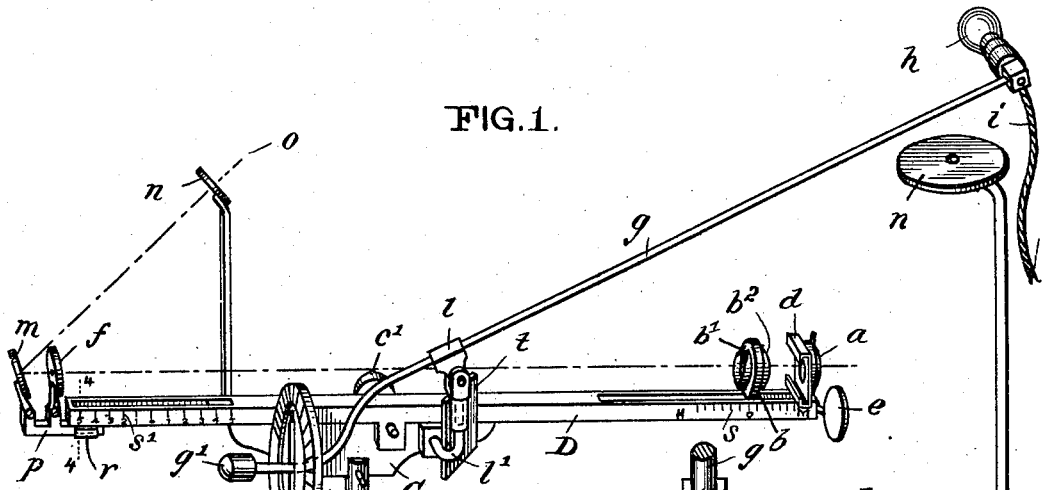
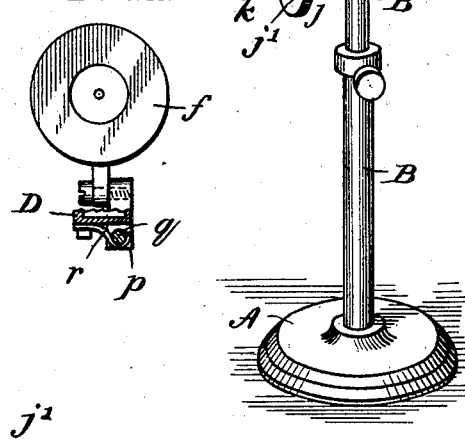
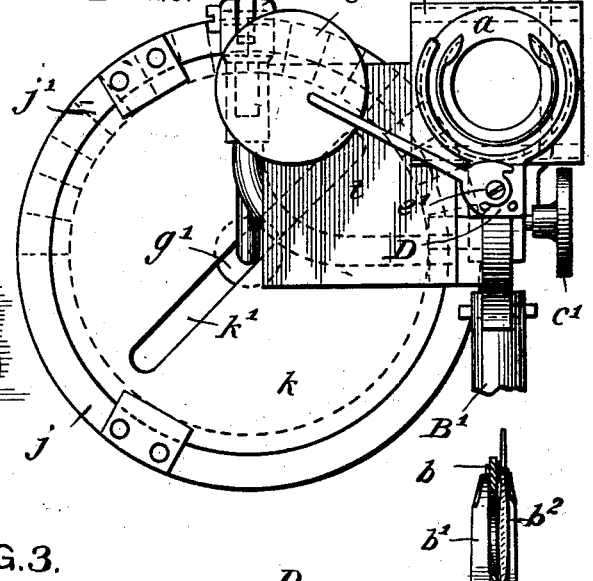
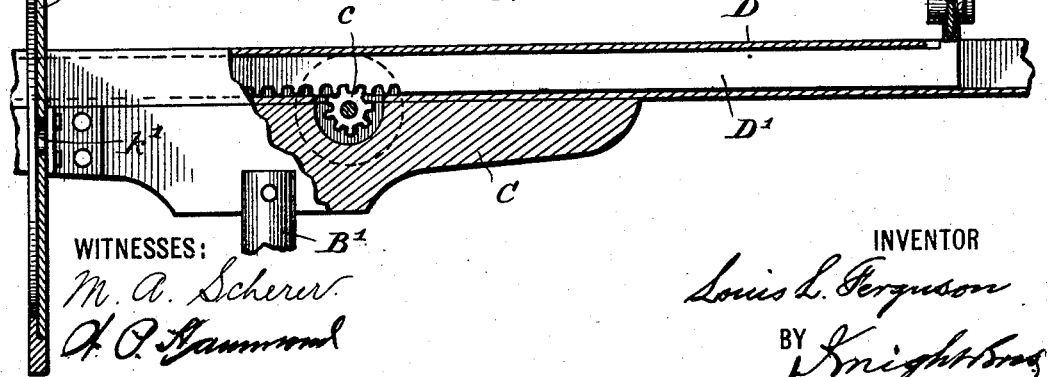
WITNESSES:
M. A. Scherer
H. O. Hammond
INVENTOR
Louis L. Ferguson
BY Knight Bros
ATTORNEYS

UNITED STATES PATENT OFFICE.

LOUIS L. FERGUSON, OF NEW YORK, N. Y.

APPARATUS FOR MEASURING ERRORS OF REFRACTION IN THE HUMAN EYE.

SPECIFICATION forming part of Letters Patent No. 679,890, dated August 6, 1901.

Application filed July 18, 1900. Serial No. 24,066. (No model.)

*To all whom it may concern:*

Be it known that I, LOUIS L. FERGUSON, a citizen of the United States, and a resident of the borough of Manhattan, city and State of New York, have invented a new and useful Apparatus for Measuring Errors of Refraction in the Human Eye, of which the following is a specification.

This instrument, which I term a "luxometer," is devised for the dual purpose of measuring the refraction in the human eye subjectively and objectively.

First, subjectively, by placing the patient in position to view a distant test-card through a lens shiftable backward and forward in a guide having a scale marked to indicate the proper notation of the lens by its relative position between the eye and the test-card, resulting in the plus or minus rays which are necessary to correct hypermetropia and myopia, respectively. In the same connection I employ an auxiliary cylindrical test-lens for discovering astigmatism and indicating the nature and extent of the same.

Second, objectively, by viewing the patient's eye through the medium of a stationary retinoscopic mirror, in combination with a shiftable light which is deflected upwardly, downwardly, or horizontally, or at any angle, in order to obtain the phenomena of the transit of the retinal reflex and penumbra which have heretofore been obtained by the deflection of the retinoscopic mirror itself.

In the accompanying drawings, Figure 1 is a perspective view of the apparatus. Fig. 2 is a front view thereof, on a larger scale, omitting the pedestal or support. Fig. 3 is a side elevation thereof, partly in section. Fig. 4 is a detail transverse section on the line 4 4, Fig. 1, showing the mode of mounting the retinoscopic mirror and the reflecting-mirror used in connection therewith, so that they may be readily turned down out of the way when the instrument is to be used subjectively by means of test-cards, &c.

On a heavy base A and an extensible standard B B' of common construction is a head C, forming a support for a horizontally-slotted beam D, in which slides a bar D'. On one end of the beam D is mounted an eyepiece or plate $a$ of annular form to provide a sight-aperture and provided with the customary cell $a'$ with springs for the easy reception and removal of trial-lenses or with a guide $a^2$ for the reception of a slide carrying trial-lenses of different powers, or the said plate $a$ may be provided with both the cell $a'$ and the guideway $a^2$ for a slide, as illustrated in the drawings. On the extremity of the sliding bar D', adjacent to the cell or lens-receiver $a$, is mounted a cell $b$ for the reception of convex or concave lenses $b'$ for testing hypermetropia or myopia, respectively, and also for the reception of a cylindrical lens $b^2$ for testing for astigmatism and capable of rotation in the customary manner. The bar D' is slid in either direction by rack and pinion $c$ by means of a milled head $c'$ for the purpose of shifting the lens-cell $b$ to a greater or less distance from the eyepiece $a$, and thus varying the relative distance of the lens-cell $b$ between the eye of the patient and a distant test-card for subjective examination or test.

$e$ represents a disk mounted by an arm on a pivot $e'$ and capable of oscillation to a limited extent, so as to throw the said disk to either side of the eyepiece $a$ and on a level therewith in order to mask or occult the eye of the patient which is not being examined.

On the opposite or rear end of the beam D is mounted a perforated retinoscopic mirror $f$ and back of this a plain mirror $m$, from which the ray of light from the eye of the patient in objective examinations is reflected through an inclined perforated disk $n$, mounted by a standard upon the beam D at proper height, distance, and angle, so that the operator looking from the point $o$ may readily find and observe the said light-ray from the eye of the patient. The retinoscopic mirror $f$ and the reflector $m$ are pivoted for adjustment in a longitudinal vertical plane, so that they may be set at the proper angle of adjustment, and they are securely held in this fixed position of adjustment while in use.

In order to dispense with the necessity of shifting the retinoscopic mirror $f$ to various angles with relation to the fixed light, as is usual in retinoscopic examinations, I provide a movable incandescent electric lamp $h$ on the extremity of a rod $g$, mounted by a universal joint $l$ upon a standard $l'$ on the fixed head C of the apparatus, the other end of the rod $g$ being provided with a handle $g'$ by which the lamp h may be moved in any direction upon the universal joint l as a center.

i represents the customary positive and negative conducting-wires of the lamp h, by which a current of electricity may be conveyed from a dry-cell battery or other source of electricity.

The rod g near the end on which the handle g' is mounted passes through a diametric slot k' in a disk k, which is rotatably mounted within a cell j, on which is marked a protractor-scale j', as to indicate accurately the inclination assumed by the slot k' in the disk k, and thereby indicate clearly the angle of the plane in which the lamp h is moved by the movement of the handle g' and rod g in the guiding-slot k'.

In order that the retinoscopic mirror f and reflector m may be readily turned out of position when not in use and when the instrument is to be used for subjective tests, the said retinoscopic mirror and reflector are mounted, as shown in Fig. 1 and in the detail section Fig. 4, upon a supporting-bar p, of square form, which rests beneath the end of the beam D and is pressed against the said beam by a bearing-spring r to hold it in position. For this purpose the bar p is formed near its forward end with a cylindrical journal q, Fig. 4, by which it rests in the yielding bearing r, so that the connected retinoscopic mirror f and the reflector m may be turned over sidewise in either direction, the spring-bearing r yielding slightly to the pressure of the corner of the square bar p against the bottom of the beam D and then pressing the side or top of the square bar p, as the case may be, against the bottom of the beam D, so as to hold said retinoscopic mirror and reflector firmly in vertical position when in use or in horizontal position when out of use. In Fig. 4 the top of the hollow beam is broken away to expose the mounting of the retinoscopic mirror.

On the side of the beam D, near its front end, is a scale s, which may be read from the forward end of the slidable bar D', so as to indicate accurately the position of the lens-cell b in subjective tests, and near the rear end of the beam is a scale s', which may be read from the rear end of the slidable bar d' in objective or retinoscopic examinations.

From the above description it will be understood that instead of moving the retinoscopic mirror by hand, which is the method heretofore employed, I obtain the same phenomena of the transit of the retinal reflex and penumbra by shifting the light itself, which is fastened to the end of the rod g, which is inclined at an oblique angle, starting from a point a few inches removed from the retinoscopic mirror, extending upward and backward to a point twelve inches, more or less, over the patient's head, and twelve or more inches backward of the same, where the electric lamp h is mounted on said rod.

The protractor-scale j' on the periphery of the circular cell j is preferably marked to indicate the different meridional angles, ranging from zero to one hundred and eighty degrees. The entrance of the handle or rod g through the slot k' in the disk k, which is rotatable to any angle in the normal plane, permits the rod and the light to be moved unfalteringly in each individual meridian by rotating the disk k to any particular meridian and then sliding the rod along the axis of the slot.

Operation: In objective or retinoscopic examinations the operator directs the patient to place his eye to the concave ocular at a, while he seats himself in juxtaposition, placing his eye to the stationary retinoscopic mirror or looks through the same from the point o through the medium of the perforated disk n and reflector m. With one hand he moves the rod, which projects through the governor or slot in the disk, and sweeps the light in any direction that may be needed, while with his other hand he grasps the milled head c' of the pinion-shaft and rotates the same, thereby increasing or decreasing the refractive power of the lens combination until the "choking" of the retinal reflex is obtained. The amount of lense-power is indicated on the scale directly in front of the mirror, thus not necessitating his getting up to observe the results of his labors.

All instruments that have hitherto been designed for this method of eye-measuring require the retinoscopic mirror to be held either loosely in the hand or held within a gimble to be manipulated by the hand. The light that is deflected by this mirror is exaggerated in its rapidity in ratio to the distance between the mirror and the observed eye, the greater the intervening distance the greater the rapidity of the transit of the light. This being so in ninety-five cases out of a hundred, the operator's process of mental differentiation cannot keep pace with the phenomena that he observes on his own retina while trying to compute the error in the observed eye, the result being mental dubiety. Furthermore, in all previous instruments the skiascopic mirror must be held close and tilted directly against the eye of the operator, said tilting being the result of what is known as "wrist motion." This objection I surmount by having the mirror stationary, but generating the movement of the electric light and its sequence (the fundus reflex) by controlling the same by the handle of the rod g as it emerges through the slot in the disk k and at a point sufficiently far away to insure the necessary steadiness.

In measuring each meridian of the eye it is necessary that the transit of the light should describe a straight unswerving line across the pupil. With previous instruments the *sine qua non* is impossible. With my instrument, by virtue of the slot in the disk k, I have a "governor" which absolutely precludes a swerving of the light in any direction other than that which the operator desires.

A perfect instrument should be so constructed that each of its cardinal points of mechanism can be simultaneously under the control of the operator. This desideratum is realized in my invention.

*t* represents a mirror mounted on the frame of the apparatus, by which the patient is enabled to fix his eye upon a distant object in the rear in order that the pupil of the eye may be in normal condition during the examination.

Having thus described my invention, the following is what I claim as new therein and desire to secure by Letters Patent:

1. In an instrument for the examination of the eyes, a suitable support, stationary means containing the observation-aperture for directing the rays of light to the eye under examination combined with movable light-supply means for coöperation with said light-directing means, as set forth.

2. In an optometrical instrument, the combination of a horizontal supporting bar or frame, a stationary retinoscopic mirror mounted on one end of said bar, an eyepiece mounted on the other end of said bar, and a lens-holder mounted on a separate sliding bar, and adjustable in relative distance between the retinoscopic mirror and eyepiece, as described.

3. In an optometrical instrument, the combination of a retinoscopic mirror, a support on which it is mounted and held in fixed position, a suitable lens-holder for retinoscopic examinations, and a lamp mounted on an adjustable support and movable in angle relatively to the retinoscopic mirror, substantially as and for the purposes set forth.

4. In an optometrical instrument, the combination of the support D, eyepiece *a*, mounted at one end thereof, lens-holder *b* mounted on a sliding support D' and adjustable relatively to the eyepiece; the hinged support *p* and retinoscopic mirror *f* mounted thereon, adapted to be fixed in stationary position for use, and to be removed from the line of vision, when the instrument is to be used for other than retinoscopic examinations, as explained.

5. The combination of a suitable support D, an adjustable lens-holder *b*, a retinoscopic mirror *f* mounted on the support in fixed position for use, and a reflector *m* mounted on a support in rear of the retinoscopic mirror, substantially as described.

6. The combination of the beam D adjustable lens-holder *b*, retinoscopic mirror *f*, reflector *m* and perforated disk or finder, substantially as and for the purposes set forth.

7. The combination of the beam D adjustable lens-holder *b*, support *p* movably mounted on the beam D, the retinoscopic mirror *f* mounted on the movable support *p*, and the reflector *m* mounted on said support in rear of the retinoscopic mirror and in line with the axis thereof, whereby the said retinoscopic mirror and reflector are held in fixed position while in use and are adapted to be moved out of the line of vision when not in use, as explained.

8. The combination of the beam D, adjustable lens-holder *b*, the sliding bar D' on which the lens-holder *b* is mounted, a mechanical adjusting device *c* for sliding the bar D', a retinoscopic mirror *f* mounted on the rear end of the beam D in fixed position for use, and a lamp *h* mounted upon an adjustable support *g*, to permit the angular movement of the lamp relatively to the retinoscopic mirror, as explained.

9. The combination of the beam D slidable bar D', lens-holder *b* mounted on said bar, retinoscopic mirror *f* mounted on the beam D in fixed position for use, movable lamp *h*, rod *g*, on which said lamp is mounted, slotted disk *k*, in which the rod *g* is guided, and the annular holder *j*, in which the slotted disk *k* is mounted rotatably, to permit the placing of the slot *k'* therein at any angle, to determine the plane of movement of the lamp *h*, as explained.

10. The combination of the support D, eyepiece *a*, adjustable lens-holder *b*, retinoscopic mirror *f*, and the mirror *t* mounted on the support in position, to enable the patient to view a distant object reflected in said mirror, while the eye is under retinoscopic examination, as explained.

L. L. FERGUSON.

Witnesses:
  A. G. CARLISLE,
  L. S. BOND.